Figure 3:
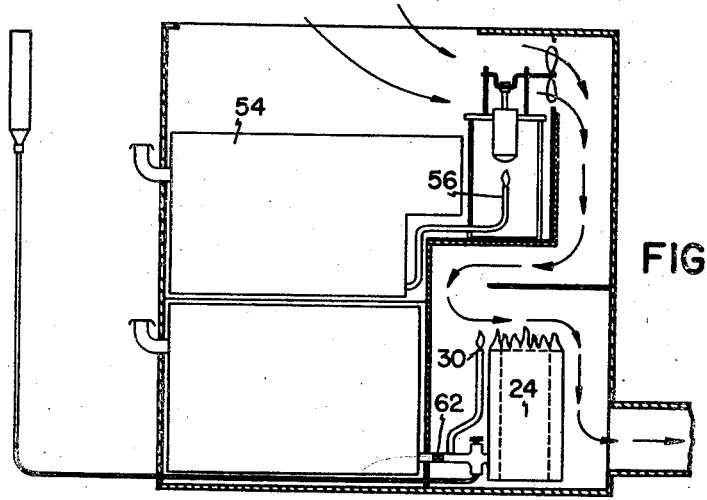

Nov. 23, 1948.                    J. E. WOODS                    2,454,296
                          SELF-PROPELLED CIRCULATING HEATER
                                Filed Dec. 22, 1945

INVENTOR.
JOHN E. WOODS
BY
*Melvin R. Jenney*
*Attorney*

Patented Nov. 23, 1948

2,454,296

UNITED STATES PATENT OFFICE 2,454,296

SELF-PROPELLED CIRCULATING HEATER

John E. Woods, Cohasset, Mass., assignor, by mesne assignments, to Standard-Thomson Corporation, Boston, Mass., a corporation of Delaware Application December 22, 1945, Serial No. 637,005

4 Claims. (Cl. 263—19)

The present invention relates to heating apparatus, and is particularly concerned with apparatus for heating storage spaces, such as freight cars, used for storing or transporting perishable foodstuffs such as fruits.

The usual form of heated freight car is provided with ice bunkers at both ends, used for holding ice for hot weather transportation. For cold weather transportation a coal heater is placed in each bunker. Reliance must be placed upon natural circulation for keeping the load at a non-freezing temperature. This type of system is objectionable because there is no control of the heat. Since the cars may be required to run without supervision over long periods and may pass through warm zones, the fruit may be damaged by overheating. Moreover, products of combustion which are rich in carbon monoxide are discharged into the car and constitute a hazard to workers who are required to enter the car for supervision and unloading.

Attempts have been made to provide a system with automatic temperature controls but these have proved complicated and expensive and do not completely avoid the difficulties of the system above described.

According to the present invention, I provide a system in which air is continuously circulated to the load and is thermostatically controlled to suit the varying temperature conditions which the car is obliged to meet. The air is circulated by a type of engine familiarly known as a hot air engine, also known as an external combustion gas engine of the Stirling, Ericcson or Rider type. Engines of this type are very simple and reliable, but they have been found of little use in industry because of their extremely low efficiency.

The low efficiency is no detriment under conditions of high heat demand. However, the engine is not self-starting, and must operate continuously without supervision. Hence, under standby conditions, when a certain minimum of heat is necessarily supplied in order that the engine may be maintained in operation, this heat is circulated to the contents of the car. I have discovered that a sufficient circulation may be maintained to cause the automatic controls to respond satisfactorily to temperature conditions, with a standby heat supply small enough to cause no substantial heating of the contents of the car.

The apparatus uses a fluid fuel, such as methyl alcohol, which undergoes sufficiently complete combustion to prevent accumulation of carbon monoxide in the car. The air under forced circulation is in direct contact with the flame, and no heat exchange apparatus which might introduce excessive resistance to circulation is required.

Figure 2:
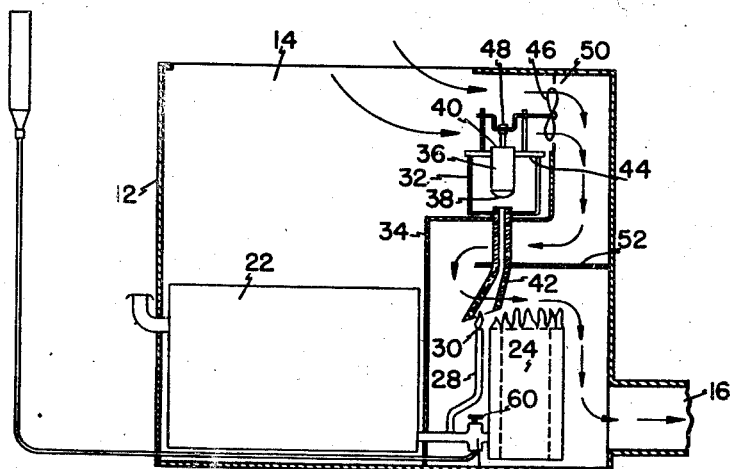
Figure 1:
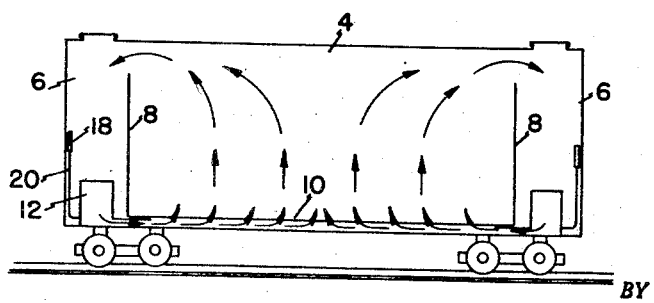

In the accompanying drawings, Fig. 1 is a diagrammatic section elevation of the freight car showing the distribution of heaters of the present invention; Fig. 2 is a diagrammatic elevation of one form of heater; and Fig. 3 is a diagrammatic elevation of a modified form of heater according to the present invention.

As shown in Fig. 1, the freight car 4 is provided at opposite ends with ice bunkers 6, the bunkers being separated from the load chamber by vertical walls 8. The car is provided with a slatted floor 10 of the usual form. As is customary, the walls of the car are well insulated. The heaters of the present invention are disposed in the ice bunkers as indicated at 12. Each heater comprises a casing having an air inlet 14 at the top and an outlet 16 at the bottom which leads into the space between the floor 10 and the bottom of the car. A thermostatic control bulb 18 is placed in any suitable position, here indicated as in the air space above the heater, although it may be in the outlet. The bulb is provided with a tube 20 for control of the fuel supply valve as will presently be described.

In the heater shown in Fig. 2 there is provided a fuel tank 22 within the casing 12. It supplies fuel, such as methyl or propyl alcohol, to a main burner 24 through a regulating valve 26. Fuel is also supplied continuously through a pipe 28 to a pilot burner 30. The valve 26 is controlled by the thermostat 18 whereby the flame from the burner 24 may be regulated. The burner may be of any conventional form but it is preferably of a type to provide a modulated heat supply, although a simple on-and-off type of burner may be used if desired.

Mounted on the casing above the burner is an engine housing 32. The engine housing is separated from the burner housing by wall 34. The portion of the wall 34 between the burner and the tank is preferably well insulated to guard against overheating of the fuel in case the circulation of air stops by reason of engine failure. An external combustion or hot air engine 36 is mounted in the engine housing. The engine is here diagrmmatically shown and may comprise an engine of the familiar Stirling, Ericcson or Rider type. It is sufficient for purposes of this description to note that such an engine has a "hot end" here indicated at 38 and a "cold end" indicated at 40. Heat is continuously supplied to the hot end 38 from the pilot burner 30 by means of an insulated chimney 42 extending from directly above the pilot flame to the bottom end of the engine. The engine will also receive some heat from the main burner 24 when the latter is lighted, so that a higher fan speed will be obtained. The cold end of the engine protrudes through a top plate 44 of the engine housing. The housing is suitably vented into the air passage to carry off the products of combustion. As heretofore noted, this type of engine is not self-starting and must be started manually.

A fan 46 is driven continuously by the engine. As here shown, the fan is directly connected to the engine by a crank 48 and this is the preferred arrangement, although it will be understood that any suitable belt or gear drive may be used between the engine and the fan. The fan is disposed in a horizontal passage 50 into which air passes from the inlet 14. Immediately above the burner is a partition 52 extending part way across the burner casing. Thus an air passage is formed whereby the air passes through the fan chamber 50, thence downwardly and over the plate 52 and finally over the pilot and main burners into the outlet 16. The cold end 40 of the engine is disposed in the upper part of the air passage.

A modified form of the invention is shown in Fig. 3 in which a separate burner is provided for the engine. The main heating burner 24, the pilot burner 30, and the thermostatic controls are as heretofore described. A separate fuel tank 54 is provided and this supplies fuel continuously to a separate burner 56 for the hot air engine. Sufficient air for combustion may be supplied to the burner 56 by openings in the engine housing 32.

According to either form of the invention, a sufficient amount of heat is continuously supplied to the engine to maintain it in continuous operation and cause a continuous even circulation of air throughout the car. The heated air and the products of combustion are discharged through the outlet 16 to the space below the slatted floor from which they rise through the load and are circulated back through the bunker 8 into the cold air inlet. The circulation is indicated by the arrows in the various figures. This continuous circulation, even though slight, is important because under sudden changes of temperature the thermostatic control is then able to reflect the temperature conditions existing in the load and thus provide the necessary change in the heat supply. A sufficient supply of oxygen for combustion is afforded by natural leakage.

Under standby conditions when no heat is required for the contents, the engine is kept running since, if it were allowed to stop, it would not start automatically. I have found that a sufficient amount of energy for driving the fan for a satisfactory circulation of air can be supplied without requiring the supply of sufficient heat to the engine to cause an undesirable rise in temperature in the car even over a protracted period. Thus, each heater under standby conditions may operate with a heat supply of the order of 500 to 2000 B. t. u. per hour. This amount of heat, although necessarily discharged into the contents, produces no appreciable effect even though the car may be required to run over a long period through warm weather. On passage of the car through a cold region, the main burner is lighted automatically and the air heated thereby is circulated to the load.

It will be noted that the apparatus is of exceptionally simple and inexpensive construction. The heating units may be easily set up in the ice bunkers, and as easily removed when the need for supplying heat no longer exists. It is only necessary to light the burners and start the engines at the beginning of a run. A sufficient amount of fuel may be provided for supplying the engine and the heat demands of the car for the full run without necessity for supervision at intermediate stations. Since a pilot flame is required for operation of the main burner, the preferred arrangement is as shown in Fig. 2, wherein the burner 30 serves the dual purpose of lighting the main burner and supplying heat to the engine; therefore no additional heat is required to run the fan beyond that required for pilot purposes.

Because of the small amount of heat required for running the engine, the apparatus may be used as a circulating system for circulating cold air for hot-weather operation. The bunker is then supplied with ice, and the apparatus of the present invention placed in a part of the bunker, or elsewhere in the car as desired. It is then only necessary to provide heat for operation of the engine, and the heating burner is turned off, as by a shut-off 60 on the valve 26 in Fig. 2, or a valve 62 in the fuel supply line to the burners 24 and 30 in Fig. 3.

Although the invention has been described as embodied in apparatus for freight car heating, it may be used for heating other spaces, such as food storage bins, warehouse rooms, etc., where controlled circulated heat is required, without the necessity of providing supervision.

Having thus described the invention, I claim:

1. Heating apparatus comprising a casing having a cold air inlet and a warm air outlet, means forming an air passage between the inlet and outlet, a main burner for fluid fuel disposed to discharge its products of combustion into said passage, thermostatic control means for the main burner, a continuously operated auxiliary burner, a manually started external combustion hot air engine having a cylinder, means for supplying heat continuously from the auxiliary burner to the hot end of the cylinder, the cold end of the cylinder being in heat exchange relationship with cold air supplied through said cold air inlet, and a fan in said passage driven by the engine.

2. Heating apparatus comprising a casing having a cold air inlet and a warm air outlet, means forming an air passage between the inlet and outlet, a main burner for fluid fuel disposed to discharge its products of combustion into said passage, thermostatic and manual control means for the main burner to permit circulation of unheated air or of heated air at controlled temperature, a continuously operated auxiliary burner, a manually started external combustion hot air engine having a cylinder, means for supplying heat continuously from the auxiliary burner to the hot end of the cylinder, the cold end of the cylinder being in heat exchange relationship with cold air supplied through said cold air inlet, and a fan in said passage driven by the engine.

3. Heating apparatus comprising a casing having a cold air inlet and a warm air outlet, means forming an air passage between the inlet and outlet, a main burner for fluid fuel disposed to discharge its products of combustion into said passage, thermostatic control means for the main burner, a continuously operated auxiliary burner serving as a pilot burner for the main burner, a manually started external combustion hot air engine having a cylinder, a chimney for supplying heat continuously from the pilot burner to the hot end of the cylinder, the cold end of the cylinder being in heat exchange relationship with cold air supplied through said cold air inlet, and a fan in said passage driven by the engine.

4. Heating apparatus comprising a casing having a cold air inlet and a warm air outlet, means forming an air passage between the inlet and outlet, a main burner for fluid fuel disposed to discharge its products of combustion into said passage, thermostatic control means for the main burner, a continuously operated auxiliary burner separate from the main burner, a manually started external combustion hot air engine having a cylinder, the cylinder having its hot end arranged to be supplied continuously with heat from the auxiliary burner, the cold end of the cylinder being in heat exchange relationship with cold air supplied through said cold air inlet, and a fan in said passage driven by the engine.

JOHN E. WOODS.

REFERENCES CITED

The following references are of record in the file of this patent:

UNITED STATES PATENTS

| Number | Name | Date |
| --- | --- | --- |
| 684,458 | Porter | Oct. 15, 1901 |
| 2,211,631 | Sweeley | Aug. 13, 1940 |
| 2,339,254 | Dill | Jan. 18, 1944 |

FOREIGN PATENTS

| Number | Country | Date |
| --- | --- | --- |
| 328,249 | Germany | Oct. 26, 1920 |